US009785593B2

(12) United States Patent
Yeh (10) Patent No.: US 9,785,593 B2
(45) Date of Patent: Oct. 10, 2017

(54) PORTABLE DEVICE WITH DATA TRANSMISSION BETWEEN MAIN SYSTEM AND SUBSYSTEM AND CONTROL METHOD THEREFOR

(71) Applicant: HTC Corporation, Taoyuan, Taoyuan County (TW)

(72) Inventor: Hsi-Cheng Yeh, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 418 days.

(21) Appl. No.: 14/488,951

(22) Filed: Sep. 17, 2014

(65) Prior Publication Data

US 2016/0077993 A1    Mar. 17, 2016

(51) Int. Cl.
| | |
|---|---|
| G06F 13/26 | (2006.01) |
| G06F 13/24 | (2006.01) |
| G06F 13/40 | (2006.01) |
| G06F 13/42 | (2006.01) |
| G06F 13/28 | (2006.01) |
| G06F 13/12 | (2006.01) |

(52) U.S. Cl.
CPC ........ *G06F 13/4022* (2013.01); *G06F 13/122* (2013.01); *G06F 13/24* (2013.01); *G06F 13/28* (2013.01); *G06F 13/4221* (2013.01); *Y02B 60/1228* (2013.01); *Y02B 60/1235* (2013.01)

(58) Field of Classification Search
USPC .................................. 710/104–110, 305–317
See application file for complete search history.

(56) References Cited

U.S. PATENT DOCUMENTS

| | | | |
|---|---|---|---|
| 5,687,388 A | 11/1997 | Wooten et al. | |
| 6,594,239 B1* | 7/2003 | Matsumaru ....... | H04L 12/40013 370/257 |
| 6,804,737 B2 | 10/2004 | Brown et al. | |
| 8,819,685 B2* | 8/2014 | Zhang ................. | G06F 9/45529 710/5 |
| 2003/0074513 A1* | 4/2003 | Grouzdev ............. | G06F 13/102 710/306 |
| 2009/0049220 A1* | 2/2009 | Conti ...................... | G06F 13/24 710/267 |
| 2012/0166679 A1* | 6/2012 | Zawacki ............... | G06F 13/385 710/8 |
| 2013/0007304 A1 | 1/2013 | Candelaria | |
| 2013/0007312 A1* | 1/2013 | Liu ........................ | G06F 13/364 710/33 |
| 2015/0278139 A1* | 10/2015 | Pamley ............... | G06F 13/4022 710/313 |

FOREIGN PATENT DOCUMENTS

TW        200813724 A      3/2008

* cited by examiner

*Primary Examiner* — Raymond Phan
(74) *Attorney, Agent, or Firm* — Birch, Stewart, Kolasch & Birch, LLP (57) ABSTRACT

A portable device provided includes a main processor, an IO processor, a channel port coupled between the main processor and the IO processor, and at least one I/O component coupled to the IO processor. The channel port includes a plurality of channels. The main processor and the IO processor are configured to occupy one of the channels for transmitting a first command therebetween and release the occupied channel after a process is performed according to the first command.

20 Claims, 10 Drawing Sheets

PORTABLE DEVICE WITH DATA TRANSMISSION BETWEEN MAIN SYSTEM AND SUBSYSTEM AND CONTROL METHOD THEREFOR

BACKGROUND OF THE INVENTION

Field of the Invention

The invention relates to a portable device, and more particularly, to a control method for a portable device.

Description of the Related Art

In general, a standard Android system uses a Linux device driver layer to control various I/O components. However, in such an architecture, all I/O components have different hardware drivers to drive them, and each hardware driver may have different software errors, which need to be resolved by different means. Therefore, a control method for various I/O components is desirable, so as to save time and manpower to resolve different software problems during the product-development stage.

BRIEF SUMMARY OF THE INVENTION

Portable devices and control methods for a portable device are provided. An embodiment of a portable device provided comprises: a main processor; an IO processor; a channel port coupled between the main processor and the IO processor, having a plurality of channels; and at least one I/O component coupled to the IO processor. The main processor and the IO processor are configured to occupy one of the channels for transmitting a first command therebetween and release the occupied channel after a process is performed according to the first command.

Furthermore, an embodiment of a control method for a portable device is provided, wherein the portable device comprises a main processor, an IO processor, an I/O component coupled to the IO processor, and a channel port coupled between the main processor and the IO processor and having a plurality of channels. One of the channels is occupied to transmit a first command between the main processor and the IO processor. A process is performed according to the first command. The occupied channel is released after the process is performed according to the first command.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
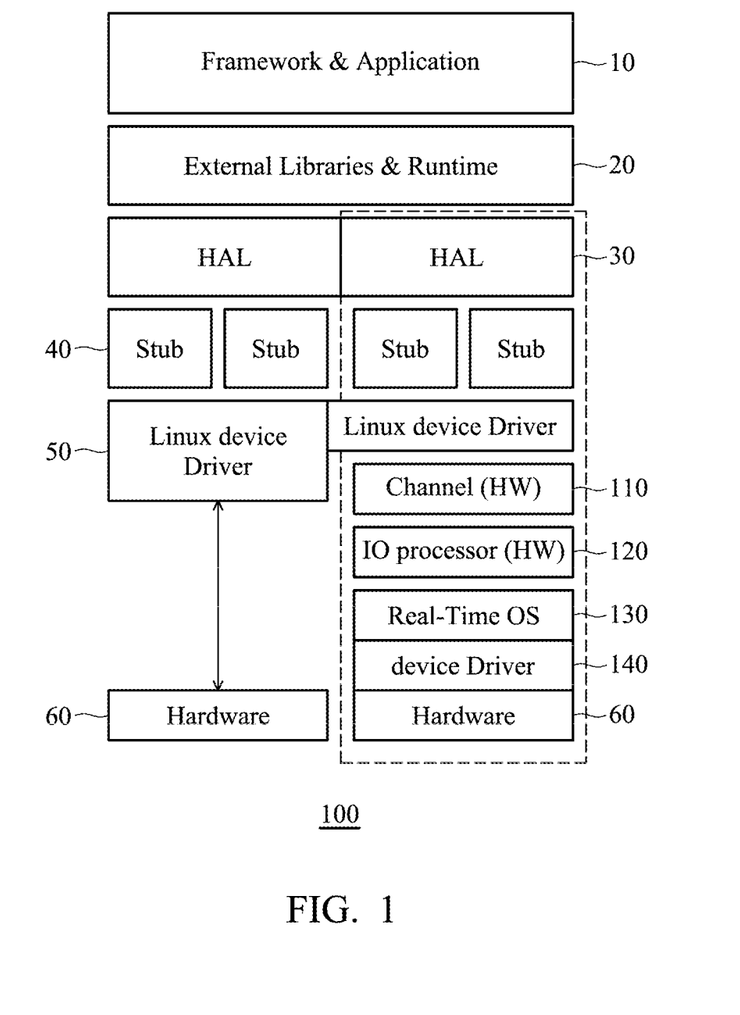
FIG. 1 shows an architecture illustrating a software system of a portable device according to an embodiment of the invention.

FIG. 1 shows an architecture illustrating a software system 100 of a portable device according to an embodiment of the invention. The software system 100 comprises a framework and application layer 10, an external-libraries and runtime layer 20, a hardware abstraction layer (HAL) 30, a stub layer 40, a Linux device driver layer 50 and a hardware layer 60. Compared with a traditional android software system, the software system 100 further comprises a channel layer 110, an (input/Output) IO processor layer 120, a real-time operating system (OS) layer 130, and a device driver layer 140. According to the software system 100, an independent processor is used to manage the I/O (input/output) components disposed in the portable device or externally connected to the portable device and to control power management for the portable device, so as to decrease loading for a main processor of the portable device. Thus, the main processor may enter an idle mode or a sleep mode, thereby decreasing the power consumption of the portable device.

Figure 2A:
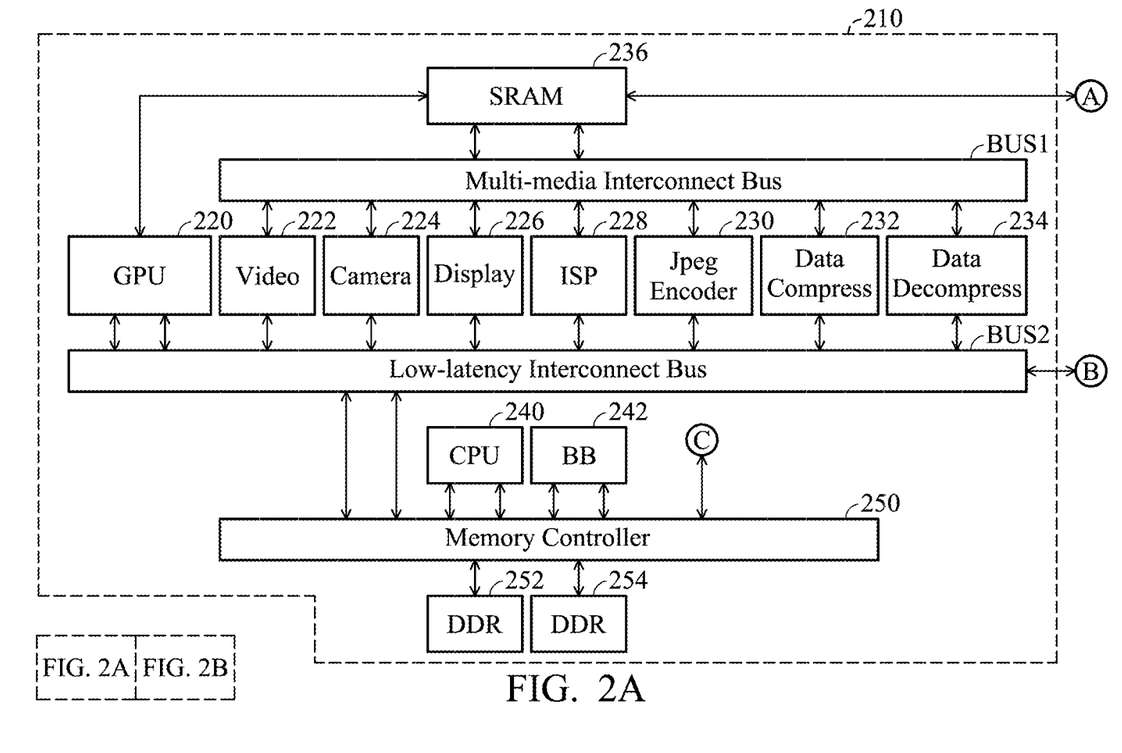
FIG. 2A and FIG. 2B show a hardware architecture illustrating a portable device according to an embodiment of the invention.
Figure 2B:
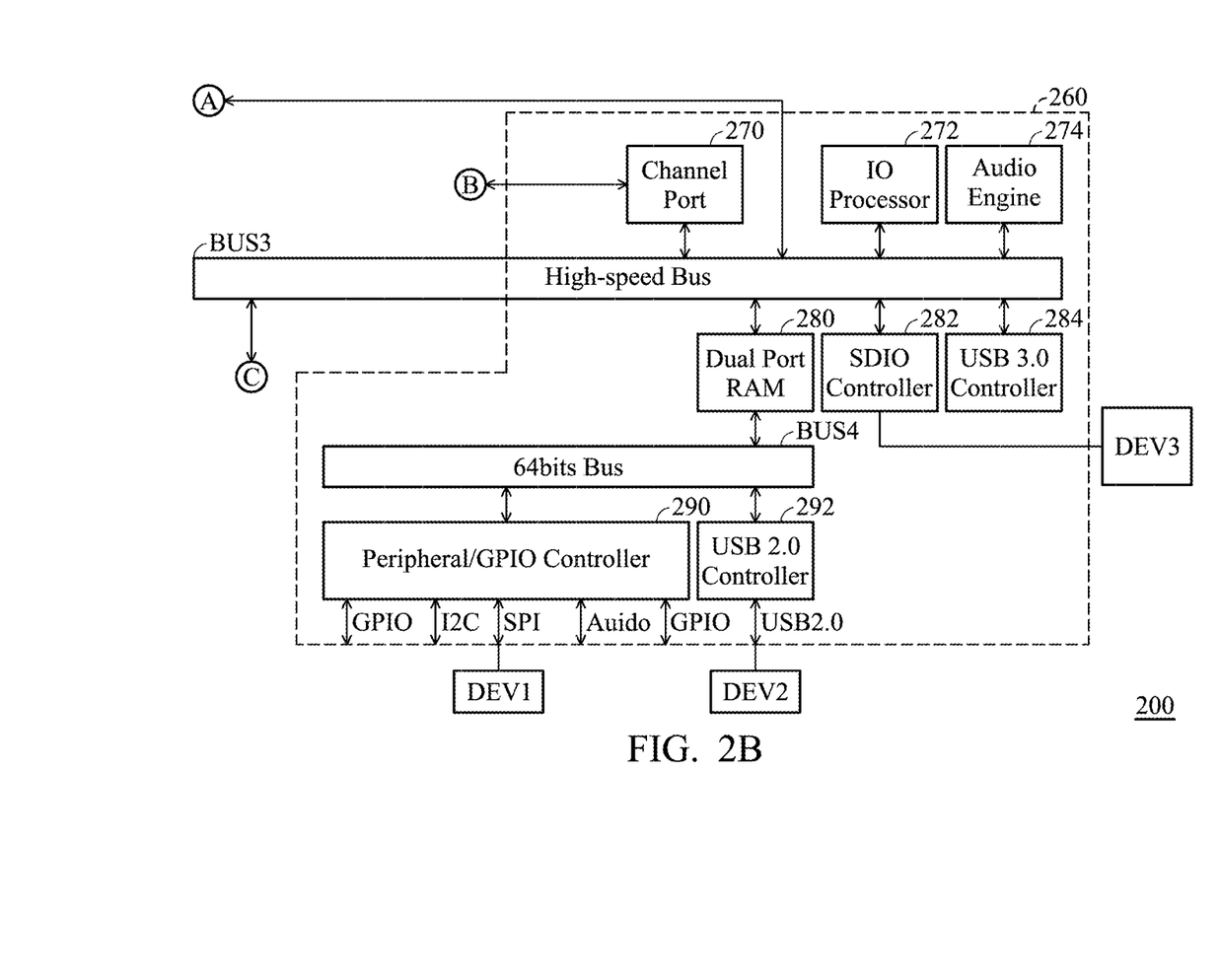

FIG. 2A and FIG. 2B show a hardware architecture illustrating a portable device 200 according to an embodiment of the invention. The portable device 200 comprises a main system 210 and a sub-system 260. The portable device 200 may be a smart phone or a tablet PC. The main system 210 comprises the buses BUS1 and BUS2, a graphics processing unit (GPU) 220, a video module 222, a camera module 224, a display module 226, an image signal processing (ISP) module 228, a jpeg encoder 230, a data compress module 232, a data decompress module 234, a static random access memory (SRAM) 236, a central processing unit (CPU) 240, a baseband (BB) chip 242, a memory controller 250, and two double data rate synchronous dynamic random access memories (DDR SDRAM) 252 and 254. The bus BUS1 is a multi-media interconnect bus, and the bus BUS2 is a low-latency interconnect bus. In the main system 210, a main OS is performed by the CPU 240 (a main processor), so as to execute high-speed operations, such as image processing operations, data compression/de-compression operations, and so on. In this embodiment, the main OS may be an embedded OS, such as Android OS or Microsoft Window based OS, embedded in a ROM, a Flash memory or any non-volatile memory (not shown). The sub-system 260 comprises the buses BUS3 and BUS4, a channel port 270, an IO processor 272, an audio engine 274, a dual port RAM 280, a secure digital input output (SDIO) controller 282, a USB 3.0 controller 284, a peripheral/GPIO controller 290, and a USB 2.0 controller 292. Compared with the bus BUS4, the bus BUS3 is a high-speed bus for transferring data between the memory controller 250 of the main system 210 and the circuits of the sub-system 260. The peripheral/GPIO controller 290 is an interface controller for providing various standard interfaces, such as inter-integrated circuit (I2C), serial peripheral interface (SPI), and so on. The channel port 270 is coupled between the central processing unit (CPU) 240 and the IO processor 272. Further, the channel port 270 is coupled with the CPU 240 through the bus BUS2 while coupled with the IO processor through the bus BUS3. In the sub-system 260, a real-time OS is performed by the IO processor 272, to execute the input/output interface operations of the portable device 200, so as to access the I/O components coupled to the sub-system 260, wherein the I/O component may be an internal input or output device disposed in the portable device 200 or an external input or output device connected to the portable device 200. For example, the peripheral/GPIO controller 290 is coupled to an audio codec DEV1 of the portable device 200 via a SPI interface. The USB 2.0 controller 292 is coupled to a USB device DEV2 via a USB interface. The SDIO controller 282 is coupled to a SD card DEV3 via a SD card interface. In the portable device 200, the CPU 240 communicates with the IO processor 272 via the channel port 270. Therefore, the IO applications of the portable device 200 can be separated from the main OS performed by the CPU 240, that is, the real-time OS performed by the IO processor 272 is dedicated to the IO applications. In this embodiment, the audio engine 274 and the devices DEV1, DEV2 and DEV3 may be I/O components of the sub-system 260. In another embodiment, a controller and a device connected thereto may be an I/O component. For example, the peripheral/GPIO controller 290 and the audio codec DEV1 connected thereto is a first I/O component; the USB 2.0 controller 292 and the USB device DEV2 connected thereto is a second I/O component; and the SDIO controller 282 and the SD card DEV3 connected thereto is a third I/O component.

Figure 3:
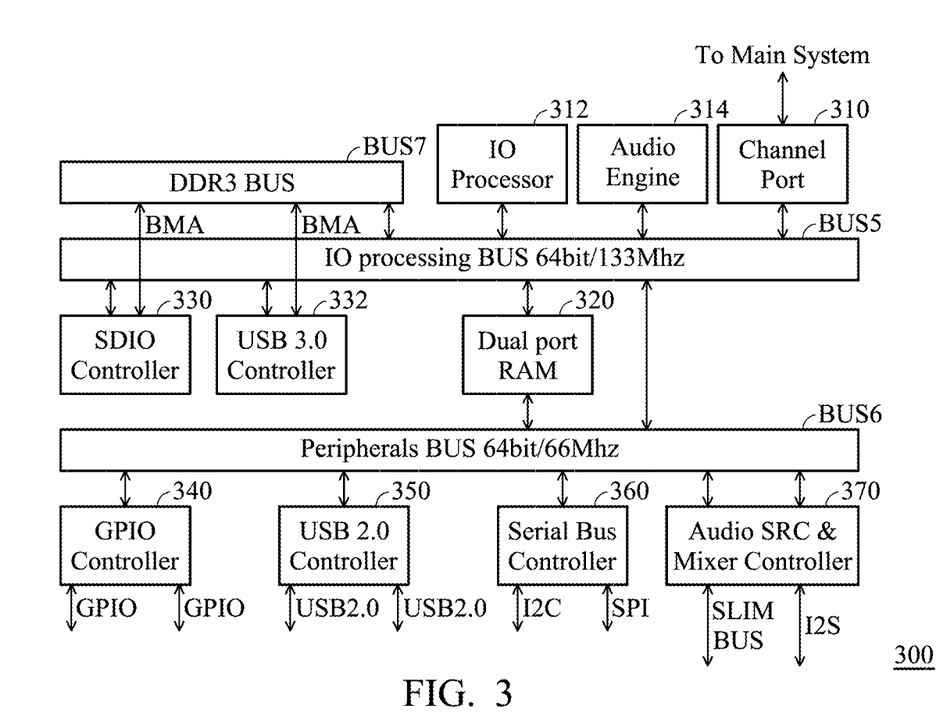
FIG. 3 shows a hardware architecture illustrating a subsystem of a portable device according to another embodiment of the invention.

FIG. 3 shows a hardware architecture illustrating a sub-system 300 of a portable device according to another embodiment of the invention. The sub-system 300 is connected to a main system, which may be similar to or the same with the main system shown in FIG. 2A, and comprises the buses BUS5 and BUS6, a channel port 310, an IO processor 312, an audio engine 314, a dual port RAM 320, a SDIO controller 330, a USB 3.0 controller 332, a GPIO controller 340, a USB 2.0 controller 350, a serial bus controller 360, and an audio SRC and mixer controller 370. In the embodiment, the sub-system 300 is implemented in an integrated circuit (IC). In one embodiment, the sub-system 300 and the main system are implemented in the same IC. The channel port 310 is coupled between the IO processor 312 and a bus, e.g. the bus BUS2 of FIG. 2A, of the main system of the portable device. The IO processor 312 communicates with the audio engine 314, the channel port 310, the dual port RAM 320, the SDIO controller 330 and the USB 3.0 controller 332 via the bus BUS5. Furthermore, the bus BUS5 is coupled to the DDR memories of the main system via a bus BUS7, thus the circuits of the sub-system 300 can access the DDR memories of the main system via the buses BUS5 and BUS7. In one embodiment, the SDIO controller 330 and the USB 3.0 controller 332 can access the DDR memory of the main system via the bus BUS7 without going through the bus BUS5. The dual port RAM 320 is coupled between the buses BUS5 and BUS6, wherein the bus BUS5 is a high-speed IO processing bus, e.g. a 64 bit/133 Mhz bus. The GPIO controller 340 is coupled to the bus BUS6, wherein the IO processor 312 can control the GPIO controller 340 to transmit data to an external device via a GPIO interface according to a command received from the main system via the channel port 310. Moreover, when the GPIO controller 340 receives data from the external device via the GPIO interface, the IO processor 312 issues a command to the main system via the channel port 310, so as to provide the data received from the external device to the main system. The USB 2.0 controller 350 is coupled to the bus BUS6, wherein the IO processor 312 can control the USB 2.0 controller 350 to transmit data to a USB 2.0 device via a USB 2.0 interface according to a command received from the main system via the channel port 310. Moreover, when the USB 2.0 controller 350 receives data from the USB 2.0 device via the USB 2.0 interface, the IO processor 312 issues a command to the main system via the channel port 310, so as to provide the data received from the USB 2.0 device to the main system. The serial bus controller 360 is coupled to the bus BUS6, wherein the IO processor 312 can control the serial bus controller 360 to transmit data to other device via an I2C interface or a SPI interface according to a command received from the main system via the channel port 310. Moreover, when the serial bus controller 360 receives data from the other device via the I2C interface or the SPI interface, the IO processor 312 issues a command to the main system via the channel port 310, so as to provide the data received from the other device to the main system. The audio SRC and mixer controller 370 is coupled to the bus BUS6, wherein the IO processor 312 can control the audio SRC and mixer controller 370 to transmit audio data to an audio component via a serial low-power inter-chip media (SLIM) bus interface or inter-IC sound (I2S) interface according to a command received from the main system via the channel port 310. Furthermore, when the audio SRC and mixer controller 370 receives audio data from the audio component, the IO processor 312 issues a command to the main system via the channel port 310, so as to provide the audio data received from the audio component to the main system for subsequent processes.

Figure 4:
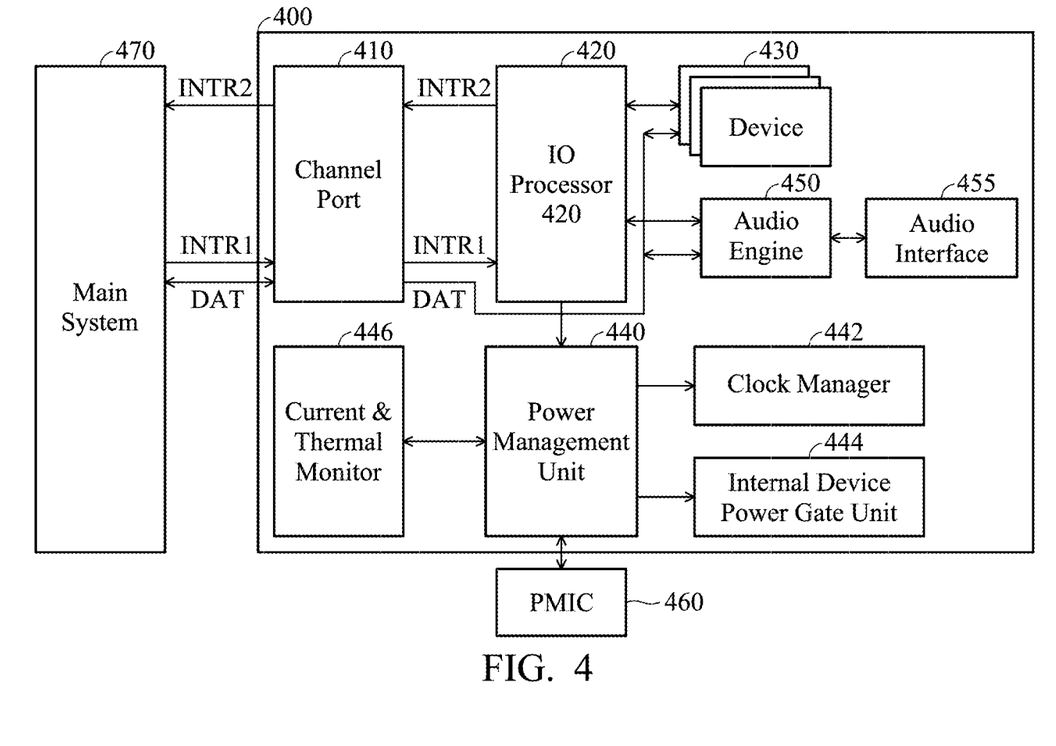
FIG. 4 shows a hardware architecture illustrating a portable device according to another embodiment of the invention.

FIG. 4 shows a hardware architecture illustrating a portable device according to another embodiment of the invention. The portable device comprises a sub-system 400 and a main system 470, which is connected to the sub-system 400 and may be similar to or the same with the main system shown in FIG. 2A. A real-time OS is performed in the sub-system 400. The sub-system 400 comprises a channel port 410, an IO processor 420 performing the real-time OS, a plurality of devices 430, an audio engine 450, an audio interface 455, a power management unit (PMU) 440, a clock manager 442, an internal device power gate unit 444, and a current and thermal monitor 446. In this embodiment, the devices 430 and the audio engine 450 may be I/O components of the sub-system 400. The channel port 410 is coupled between the main system 470 and the IO processor 420, wherein a main OS is performed in the main system 470. The channel port 410 comprises a plurality of channels for transmitting commands and various data, including but not limited to audio data, data-transfer information and device status, between the main system 470 and the sub-system 400. The channel port 410 receives an interrupt INTR1 from the main system 470 and provides it to the IO processor 420 via an available channel. In response to the interrupt INTR1, the IO processor 420 obtains a command corresponding to the interrupt INTR1 via the available channel, and then the IO processor 420 performs a processor according to the command, so as to manage and control the corresponding device 430, the audio engine 450 or the PMU 440. Furthermore, when the device 430, the audio engine 450 or the PMU 440 needs to communicate with the main system 470, the IO processor 420 provides an interrupt INTR2 to the main system 470 via an available channel of the channel port 410. In response to the interrupt INTR2, a main processor of the main system 470 obtains a command corresponding to the interrupt INTR2 via the available channel, and then the main processor performs a process according to the command and communicates with the device 430, the audio engine 450 or the PMU 440. In FIG. 4, the IO processor 420 further controls the PMU 440 according to the interrupt INTR1 from the main system 470, so as to control the clock manager 442, the internal device power gate unit 444 and a power management integrated circuit (PMIC) 460. For example, when a USB device 430 is connected to the portable device, the main system 470 issues an INTR1 to the IO processor 420 through the channel port 410 for configuring the USB device 430 via a USB device driver (not shown). Simultaneously, the PMU 440 controls the clock manager 442 to provide the related clocks to the USB device 430, and controls the internal device power gate unit 444 and the PMIC 460 to provide an operating power to power the USB device 430. Thus, after the USB device 430 is configured and powered, the USB device 430 and the main system 470 can transfer data DAT to each other through the channel port 410. In this embodiment, the sub-system 400 may include the buses BUS3 and BUS4 and the components 280, 282, 284, 290 and 292 of FIG. 2B coupled between the IO processor 420 and the devices 430, and the device 430 may be the device DEV1, DEV2 or DEV3 of FIG. 2B.

Figure 5:
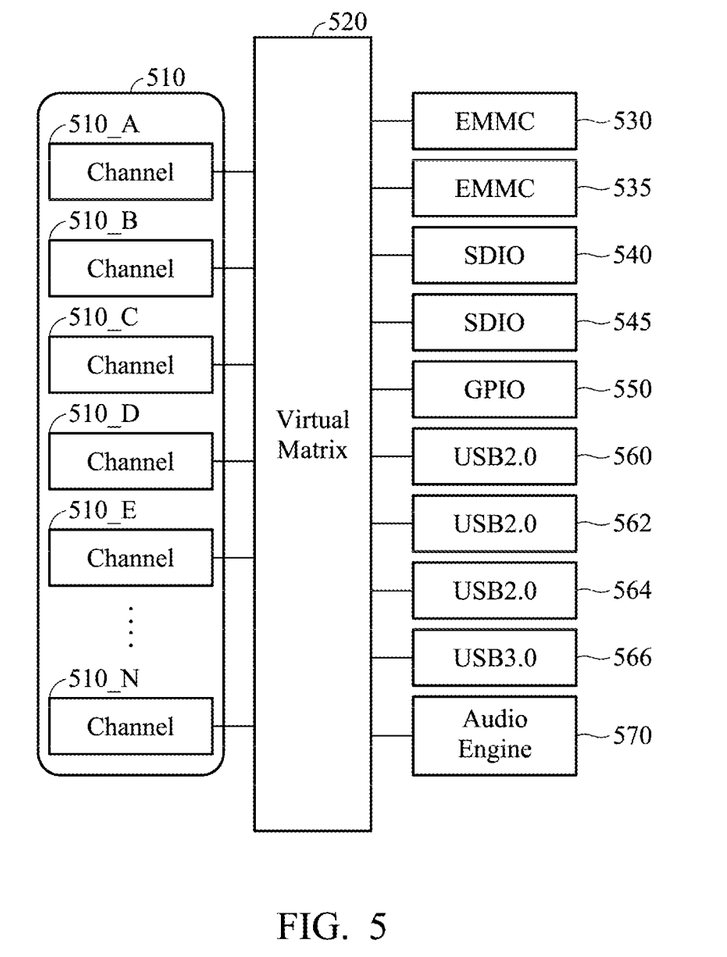
FIG. 5 shows a block diagram illustrating a channel architecture between a main system and a sub-system in a portable device according to an embodiment of the invention.

FIG. 5 shows a block diagram illustrating a channel architecture between a main system and a sub-system in a portable device according to an embodiment of the invention. A channel port 510 comprises a plurality of channels 510_A-510_N. A virtual matrix 520 is used to flexibly assign at least one variable channel of the channels 510_A-510_N for transmitting commands and data between at least one of devices 530-570 and a main system of the portable device, wherein the virtual matrix 520 can be implemented by a main processor of the main system as shown in FIG. 2A or an IO processor of a sub-system as shown in FIG. 2B, FIG. 3 or FIG. 4 in the portable device. For example, assuming that the channels 510_A and 510_B are respectively occupied by an EMMC (embedded multimedia card) device (e.g. a flash memory) 530 and a USB 2.0 device 560, and other channels 510_C-510_N are available, when the main processor of the main system needs to use the audio engine 570 for playing an audio file (e.g. a mp3 file), the virtual matrix 520 will assign one of the available channels 510_C-510_N to be used by the main processor and the audio engine 570 so that the main processor can communicate with and control the audio engine 570 for playing the audio file via the assigned channel. After the communication between the audio engine 570 and the main processor is completed, that is, after the assigned channel is no longer used by the audio engine 570 and the main processor, the virtual matrix 520 will release the assigned channel so that the assigned channel becomes an available channel. In one embodiment, each channel is implemented by a register or a dual port RAM. In addition, each channel is used to transmit commands and various data, including but not limited to audio data, status of the corresponding device and data-transfer information, between the main processor and the corresponding device.

Figure 6:
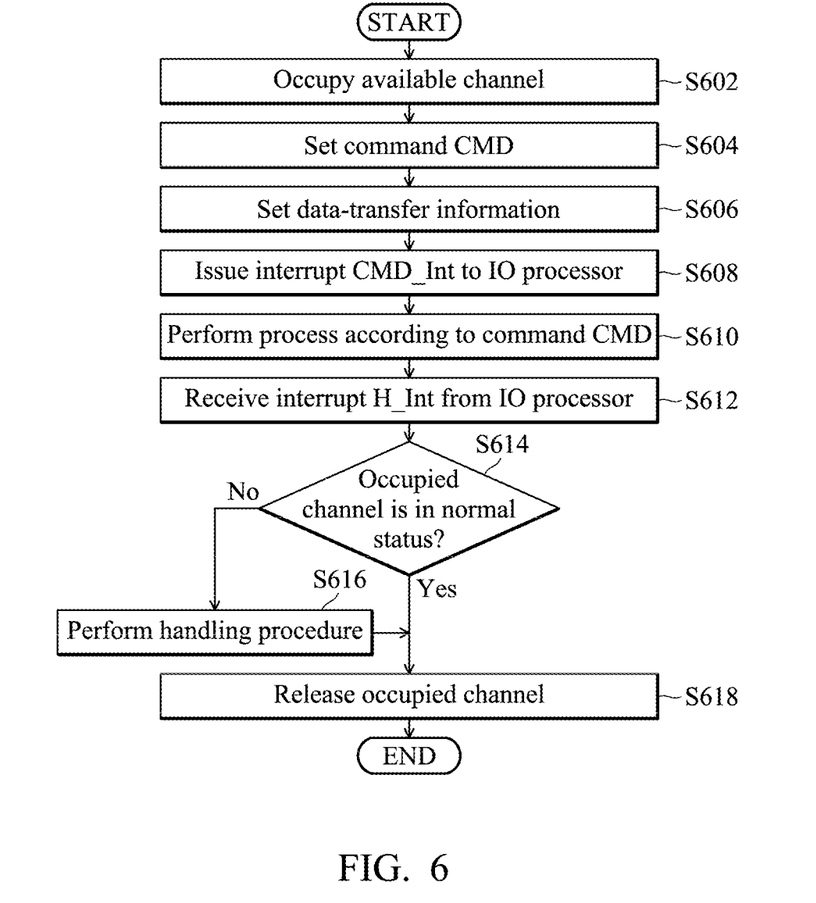
FIG. 6 shows a control method for a portable device according to an embodiment of the invention.

FIG. 6 shows a control method for a portable device according to an embodiment of the invention. The portable device comprises a main system, which includes a main processor (e.g. the CPU 240 of FIG. 2A), and a sub-system, which includes an IO processor (e.g. the IO processors 272, 312, 420 of FIG. 2B, FIG. 3 and FIG. 4) and a channel port (e.g. the channel ports 270, 310, 410 of FIG. 2B, FIG. 3 and FIG. 4). In addition, the I/O component may be any device in the sub-system described in FIG. 2B, FIG. 3, FIG. 4 or FIG. 5. First, in step S602, an available channel of a channel port in the sub-system is assigned to and occupied by the main processor. Next, in step S604, the main processor sets a command CMD in the occupied channel, and further sets data-transfer information in the occupied channel (step S606). Next, in step S608, the main processor issues an interrupt CMD_Int to the IO processor via the channel port. Next, in step S610, the command CMD is obtained via the occupied channel and performed by the IO processor in response to the interrupt CMD_Int, so as to control an I/O component to perform a process according to the command CMD and the data-transfer information in the occupied channel, and after the process is completed, the IO processor issues an interrupt H_Int to the main processor. Next, in step S612, the main processor receives the interrupt H_Int from the IO processor. Next, in step S614, it is checked by the main processor whether the occupied channel is in a normal status. If the occupied channel is in the normal status, the occupied channel is then released (step S618). If the occupied channel is not in the normal status, a handling procedure is performed (step S616), such as retry or error recovery, and then the occupied channel is released (step S618). In the embodiment, the occupied channel can be released by the main processor or the IO processor. In another embodiment, the occupied channel may be directly released without performing the steps S614 and S616.

Figure 7:
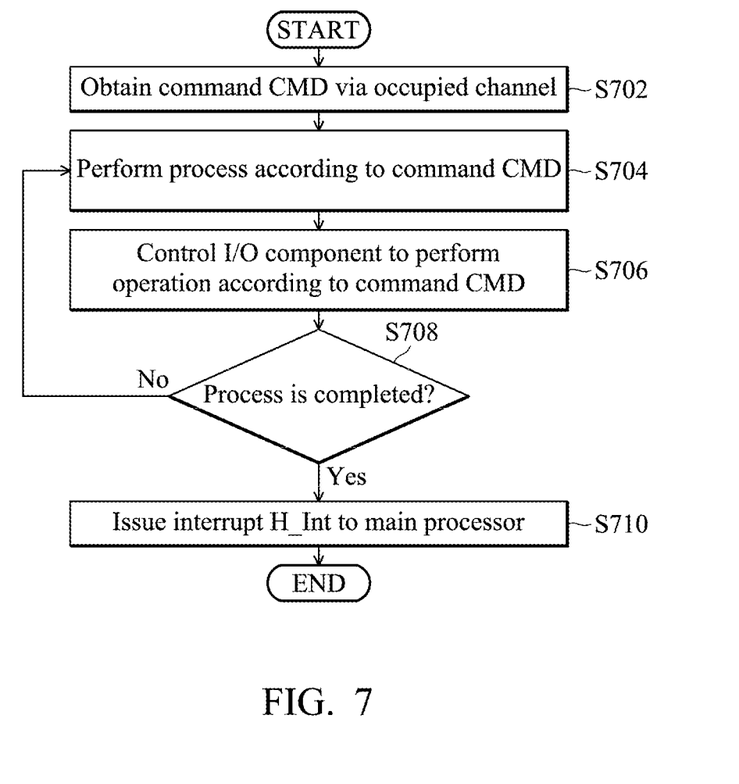
FIG. 7 shows a flow chart illustrating step S610 of FIG. 6 according to an embodiment of the invention.

FIG. 7 shows a flow chart illustrating step S610 of FIG. 6 according to an embodiment of the invention. First, in step S702, the IO processor obtains the command CMD via the occupied channel in response to the interrupt CMD_Int. Next, in step S704, the process according to the command CMD and the data-transfer information is performed by the IO processor. Next, in step S706, the IO processor controls the I/O component to perform an operation according to the command CMD. Furthermore, according to the data-transfer information from the occupied channel, the IO processor controls the I/O component to perform a data transfer. Next, in step S708, the IO processor determines whether the process corresponding to the command CMD is completed. If no, the flow returns to step S704, and the process corresponding to the command CMD is still performed. If the process, the operation and the data transfer are completed, the IO processor issues the interrupt H_Int to the main processor (step S710).

Referring to FIGS. 2A, 2B, 5-7 together, taking as an example a case where the main processor (e.g. the CPU 240 of FIG. 2A) needs to read a file (e.g. a video file) stored in the EMMC device (e.g. a flash memory) 530 of the portable device, the main processor first occupies an available channel 510_D of the channel port 510 (step S602 of FIG. 6). Next, the main processor sets a command CMD and data-transfer information in the channel 510_D (step S604 and step S606 of FIG. 6), wherein the command CMD represents a requirement for accessing the EMMC device 530, and the data-transfer information indicates that the file is to be transferred from the EMMC device 530 to a memory, e.g. SRAM 236 or DDR SDRAM 252-254, of the main system. Next, the main processor issues an interrupt CMD_Int to the IO processor (step S608 of FIG. 6). Next, the IO processor obtains the command CMD (step S702 of FIG. 7), and the IO processor directs the EMMC device 530 to transfer the file to the memory of the portable device (step S704 and step S706 of FIG. 7). When the file is completely transferred to the memory of the main system (step S708 of FIG. 7), the IO processor issues the interrupt H_Int to the main processor (step S710 of FIG. 7). After receiving the interrupt H_Int (step S612 of FIG. 6), the main processor checks whether the occupied channel 510_D is in a normal status (step S614 of FIG. 6). If the occupied channel 510_D is in a normal status, the channel 510_D is then released (step S618 of FIG. 6), and the flow is completed.

Referring to FIGS. 2A, 2B, 5-7 together, taking as an example a case where a baseband chip (e.g. the baseband chip 242 of FIG. 2A) needs to use the audio engine 570 to perform a signal process for audio data during a call, the main processor first occupies an available channel 510_A of the channel port 510 (step S602 of FIG. 6). Next, the main processor sets command CMD and data-transfer information in the channel 510_A (step S604 and step S606 of FIG. 6), wherein the command CMD represents a requirement for using the audio engine 570, and the data-transfer information indicates that the audio data is to be transferred between the audio engine 570 and the baseband chip. Next, the main processor issues an interrupt CMD_Int to the IO processor (step S608 of FIG. 6). Next, the IO processor obtains the command CMD (step S702 of FIG. 7), and the IO processor directs the audio engine 570 to perform the signal process for audio data (step S704 and step S706 of FIG. 7). When the signal process is completely by the audio engine 570 (step S708 of FIG. 7), the IO processor issues the interrupt H_Int to the main processor (step S710 of FIG. 7). After receiving the interrupt H_Int (step S612 of FIG. 6), the main processor checks whether the occupied channel 510_A is in a normal status (step S614 of FIG. 6). If the occupied channel 510_A is in a normal status, the channel 510_A is then released (step S618 of FIG. 6), and the flow is completed. Thus, the baseband chip can use the audio engine 570 without going through the main processor, and the main processor can enter an idle mode or a sleep mode to save power.

Figure 8:
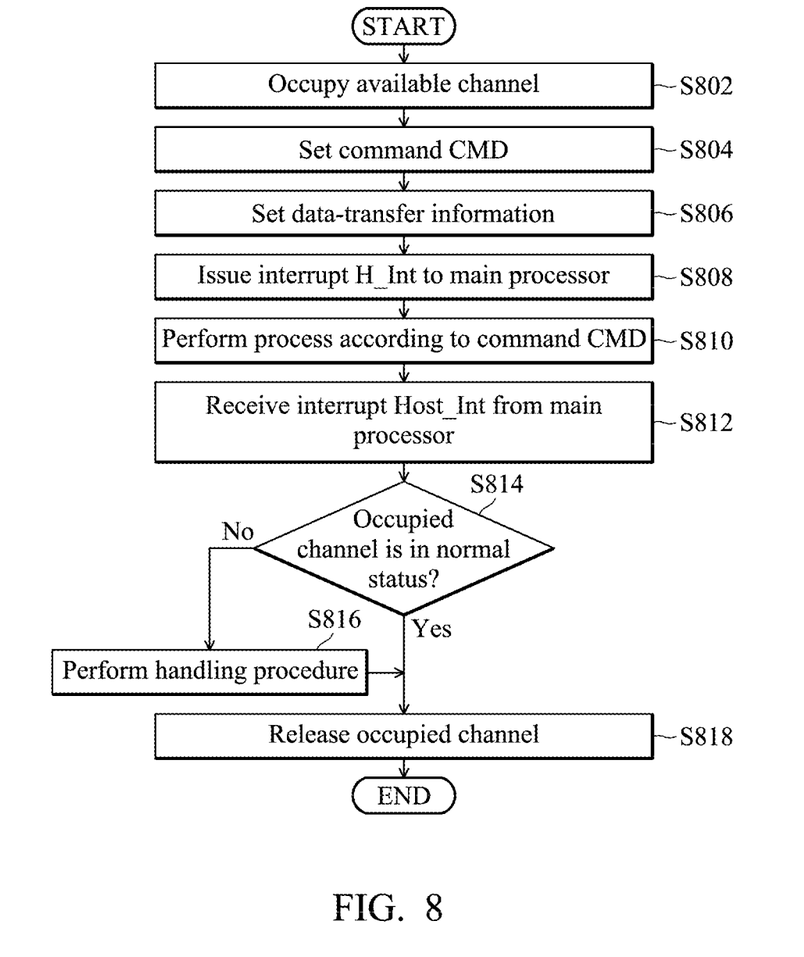
FIG. 8 shows a control method for a portable device according to another embodiment of the invention.

FIG. 8 shows a control method for a portable device according to another embodiment of the invention. The portable device comprises a main system, which includes a main processor (e.g. the CPU 240 of FIG. 2A), and a sub-system, which includes an IO processor (e.g. the IO processors 272, 312, 420 of FIG. 2B, FIG. 3 and FIG. 4) and a channel port (e.g. the channel ports 270, 310, 410 of FIG. 2B, FIG. 3 and FIG. 4). In addition, the I/O component may be any device in the sub-system described in FIG. 2B, FIG. 3, FIG. 4 or FIG. 5. First, in step S802, an available channel of a channel port in the sub-system is occupied by the IO processor. Next, in step S804, the IO processor sets the command CMD and status of an I/O component in the occupied channel, and further sets data-transfer information in the occupied channel (step S806). Next, in step S808, the IO processor issues an interrupt H_Int to the main processor via the channel port. Next, in step S810, the command CMD is obtained and performed by the main processor in response to the interrupt H_Int, so as to perform a process for an I/O component according to the command CMD and the data-transfer information, and after the process is completed, the main processor issues an interrupt Host_Int to the IO processor. Next, in step S812, the IO processor receives the interrupt Host_Int from the main processor. Next, in step S814, it is checked whether the occupied channel is in a normal status. If the occupied channel is in the normal status, the occupied channel is then released (step S818). If the occupied channel is not in the normal status, a handling procedure is performed (step S816), such as retry or error recovery, and then the occupied channel is released (step S818). In the embodiment, the occupied channel can be released by the main processor or the IO processor. In another embodiment, the occupied channel may be directly released without performing the steps S814 and S816.

Figure 9:
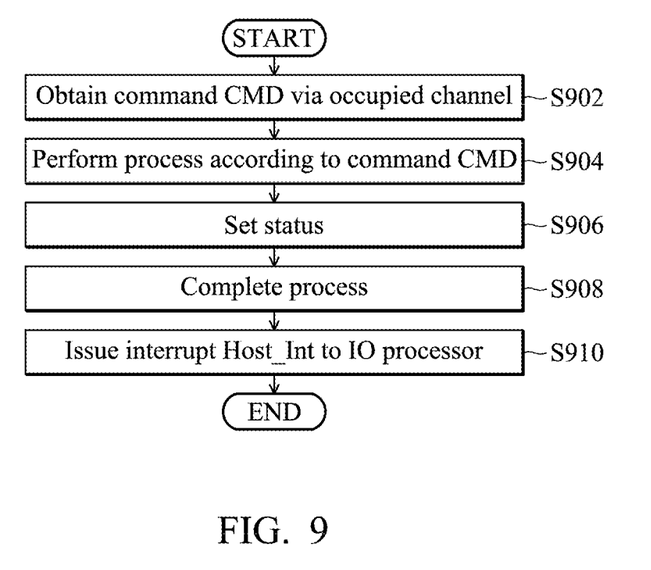
FIG. 9 shows a flow chart illustrating step S810 of FIG. 8 according to an embodiment of the invention.

FIG. 9 shows a flow chart illustrating step S810 of FIG. 8 according to an embodiment of the invention. First, in step S902, the main processor obtains the command CMD via the occupied channel in response to the interrupt H_Int. Next, in step S904, the process for the I/O component according to the command CMD and the data-transfer information is performed by the main processor. Next, in step S906, the main processor sets the status of the process in the occupied channel. Next, in step S908, the main processor completes the process, and issues the interrupt Host_Int to the IO processor (step S910).

Referring to FIGS. 2A, 2B, 5 and 8-9 together, taking as an example a case where a USB 3.0 device 566 is connected to the portable device, the IO processor first occupies an available channel 510_B of the channel port 510 (step S802 of FIG. 8). Next, the IO processor sets a command CMD, status of the USB 3.0 device 566, and data-transfer information in the channel 510_B (step S804 and step S806 of FIG. 8), wherein the command CMD represents a requirement for configuring the USB 3.0 device 566, and the data-transfer information indicates that an identification information is to be transferred from the USB 3.0 device 566 to the main processor of the portable device. Next, the IO processor issues an interrupt H_Int to the main processor (step S808 of FIG. 8). Next, the main processor obtains the command CMD (step S902 of FIG. 9), and the main processor starts to configure the USB 3.0 device 566 (step S904 and step S906 of FIG. 9). When the USB 3.0 device 566 is configured (step S908 of FIG. 9), the main process issues the interrupt Host_Int to the IO processor (step S910 of FIG. 9). After receiving the interrupt Host_Int (step S812 of FIG. 8), the IO processor checks whether the occupied channel 510_B is in a normal status (step S814 of FIG. 8). If the occupied channel 510_B is in the normal status, the occupied channel 510_B is released (step S818 of FIG. 8), and the flow is completed.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A portable device, comprising:
    a main processor;
    an IO processor;
    a channel port coupled between the main processor and the IO processor and having a plurality of channels; and
    at least one I/O component coupled to the IO processor,
    wherein the main processor and the IO processor are configured to occupy one of the channels for transmitting a first interrupt and a first command therebetween and release the occupied channel after a process is performed according to the first command, and
    wherein when the one of the channels is occupied, the main processor and the I/O component transmit data therebetween via the occupied channel without going through the IO processor.

2. The portable device as claimed in claim 1, wherein the channel port is coupled with the main processor through the first bus and coupled with the IO processor through a second bus.

3. The portable device as claimed in claim 1, wherein the main processor is configured to perform a main OS embedded in a non-volatile memory and the IO processor is configured to perform a real-time OS.

4. The portable device as claimed in claim 1, wherein the occupied channel is further used for transmitting data between the main processor and the I/O component.

5. The portable device as claimed in claim 1, wherein the main processor and the IO processor are configured to release the occupied channel after a process is performed and completed.

6. The portable device as claimed in claim 1, wherein the main processor is configured to issue a first interrupt to the IO processor, and in response to the first interrupt, the IO processor obtains the first command from the main processor via the occupied channel and controls the I/O component to perform the process according to the first command.

7. The portable device as claimed in claim 1, wherein the IO processor is configured to issue a first interrupt to the main processor, and in response to the first interrupt, the main processor obtains the first command from the IO processor via the occupied channel and performs the process for the I/O component according to the first command.

8. The portable device as claimed in claim 1, wherein the I/O component is an audio engine, a USB device, a memory device, a SDIO device or a GPIO device.

9. The portable device as claimed in claim 1, further comprising:
a power management unit coupled to the IO processor and configured to provide power to the main processor or the I/O component according to a second command issued by the main processor via the occupied channel.

10. The portable device as claimed in claim 6, wherein after the process is completed, the IO processor is configured to issue a second interrupt to the main processor, and in response to the second interrupt, the occupied channel is released by the main processor or the IO processor.

11. The portable device as claimed in claim 7, wherein after the process is completed, the main processor is configured to issue a second interrupt to the IO processor, and in response to the second interrupt, the occupied channel is released by the main processor or the IO processor.

12. A control method for a portable device, which includes a main processor, an IO processor, an I/O component coupled to the IO processor, and a channel port coupled between the main processor and the IO processor and having a plurality of channels, the control method comprising:
occupying one of the channels to transmit a first interrupt and a first command between the main processor and the IO processor;
performing a process according to the first command;
transmitting data between the main processor and the I/O component via the occupied channel without going through the IO processor; and
releasing the occupied channel after the process is performed according to the first command.

13. The control method as claimed in claim 12, wherein the step of releasing the occupied channel after the process is performed according to the first command further comprises:
releasing the occupied channel after the process is performed and completed according to the first command.

14. The control method as claimed in claim 12, further comprising:
issuing a first interrupt by the main processor to the IO processor;
in response to the first interrupt, obtaining the first command by the IO processor from the main processor via the occupied channel; and
controlling the I/O component by the IO processor to perform the process according to the first command.

15. The control method as claimed in claim 12, further comprising:
issuing a first interrupt by the IO processor to the main processor;
in response to the first interrupt, obtaining the first command by the main processor from the IO processor via the occupied channel; and
performing the process by the main processor for the I/O component according to the first command.

16. The control method as claimed in claim 12, further comprising:
checking whether the occupied channel is in a normal status; and
performing the releasing step if it is checked that the occupied channel is in the normal status.

17. The control method as claimed in claim 12, further comprising:
transmitting data between the main processor and the I/O component via the occupied channel.

18. The control method as claimed in claim 12, further comprising:
providing power to the main processor or the I/O component according to a second command issued by the main processor via the occupied channel.

19. The control method as claimed in claim 14, further comprising:
after the process is completed, issuing a second interrupt by the IO processor to the main processor, wherein the step of the step of releasing the occupied channel after the process is performed according to the first command further comprises:
in response to the second interrupt, releasing the occupied channel after the process is performed.

20. The control method as claimed in claim 15, further comprising:
after the process is completed, issuing a second interrupt by the main processor to the IO processor, wherein the step of the step of releasing the occupied channel after the process is performed according to the first command further comprises:
in response to the second interrupt, releasing the occupied channel after the process is performed.

* * * * *